July 5, 1949.  G. J. GIBSON  2,475,183
APPARATUS FOR STABILIZING THE ELECTRIC WELDING ARC
Filed June 9, 1948
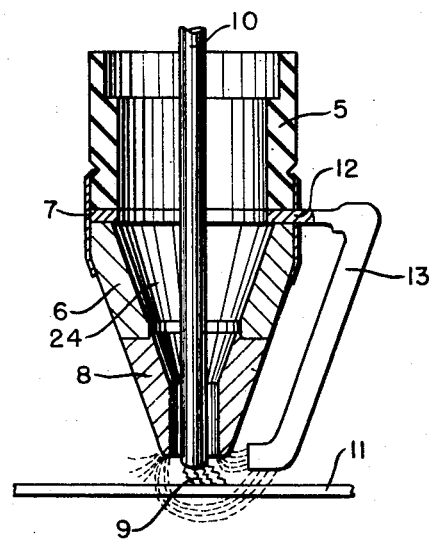
FIG. 1
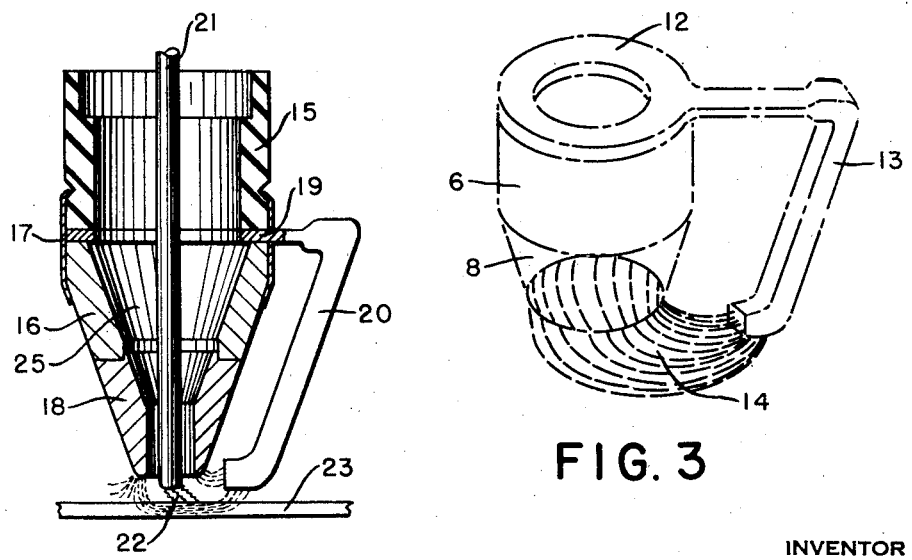
FIG. 2
FIG. 3
INVENTOR
GLENN J. GIBSON
BY
ATTORNEYS Patented July 5, 1949

2,475,183

UNITED STATES PATENT OFFICE 2,475,183

APPARATUS FOR STABILIZING THE ELECTRIC WELDING ARC

Glenn J. Gibson, Chatham, N. J., assignor to Air Reduction Company, Incorporated, New York, N. Y., a corporation of New York Application June 9, 1948, Serial No. 31,920

3 Claims. (Cl. 219—8)

This invention relates to electric arc welding, and particularly to apparatus adapted to direct the arc and to avoid irregular operation thereof.

In the welding operation, the direct current arc is relatively unstable due to inherent conditions. Thus, the current in the electrode sets up magnetic fields which tend to "blow" the arc. Also, inasmuch as there must be relative movement between the electrode and the workpiece, forces affecting the arc are produced when the magnetic field about the moving arc is distorted by the presence of other fields. The arc has a tendency to skip and wander, which makes it difficult for the operator to hold the arc in the desired line of operation. Better welds can be made if the arc is stabilized and the direction of the work is controlled.

It is the object of the present invention to provide an apparatus whereby the arc is stabilized, shielded from extraneous magnetic fields, and controlled directionally so that the operator can move the arc along the weld without danger of wandering, skipping, and blowing.

Other objects and advantages of the invention will be apparent as it is better understood by reference to the following specification and the accompanying drawing, in which Fig. 1 is a vertical sectional view through an apparatus adapted for the purpose of the invention and illustrating the action of the arc with a non-magnetic workpiece;

Fig. 2 is a similar view showing the action of the arc with a paramagnetic workpiece; and Fig. 3 is a view in perspective illustrating more particularly the pattern of the magnetic field as formed in the apparatus as described.

Referring to the drawing, 5 indicates a suitable support to which an annular magnet 6 may be secured, for example by a ring 7. The magnet 6 may be a permanent magnet or an electromagnet. An extension 8 of paramagnetic material such as soft iron is secured to the magnet 6 and extends the field thereof while protecting the magnet from the effect of the arc 9 which is formed between the end of an electrode 10 and the workpiece 11 which, as shown in Fig. 1, is of non-magnetic material.

The electrode 10 may be a non-consuming electrode such as carbon or tungsten, or it may be a consuming metallic electrode and, in the latter case, it may be fed continuously in any suitable manner so that as the electrode is consumed, fresh material is continuously available.

A ring 12, of paramagnetic material such as soft iron, is disposed between the magnet 6 and the support 5 in contact with the magnet 6. It is provided with a lateral arm or pole 13 which extends toward and terminates at a point spaced from the lower end of the electrode 10 and of the extension 8. The ring 12 is adjustable so that the pole 13 may be moved about the magnet 6 and the extension 8 to any desired position. As will be seen by reference to Fig. 3 of the drawing, the provision of the pole 13 results in the formation of a magnetic field 14, since the pole 13 provides a very low reluctance path for the magnetic flux. There is a very strong concentration of flux lines across the gap between the end of the extension 8 and the end of the pole 13. The horn-shaped field, starting with the diameter of the bottom of the extension 8 and curving and tapering toward the end of the pole 13, causes the arc to extend in the direction of the pole 13 because the arc is reluctant to cross the flux lines and follows the direction of the magnetic field. Thus, the arc may be deflected toward the pole 13 and, by adjusting the pole about the axis of the device, the arc may be directed as required. This facilitates the operation of welding, since the arc is stabilized and the operator can control its direction.

Referring to Fig. 2, the support 15 carries a magnet 16 which is connected to the support by a ring 17. An extension 18 is secured to the magnet 16. A ring 19 is disposed between the support and the magnet 16 and carries a pole 20 which terminates in spaced relation with the extension 18 and with an electrode 21. The arc 22 forms between the end of the electrode 21 and the workpiece 23 which, in this case, is paramagnetic. The arc 22 is directed precisely as in the preceding embodiment of the invention, by the magnetic field formed between the end of the pole 20 and the lower end of the extension 18.

While the invention is applicable generally to electric arc welding, it is particularly suitable and useful in connection with arcs which are provided with shields of inert gas such as helium, argon and the like. The shield is formed readily by supplying the gas to the chamber 24 in Fig. 1 or to the chamber 25 in Fig. 2. The shielding gas passes down around the electrode 10 or 21 and emerges to form a blanket about the arc 9 or 22 which prevents the access of atmospheric air to the weld and therefore protects it against oxidation.

Various changes may be made in the details of the apparatus employed and in the operation thereof, without departing from the invention or sacrificing the advantages thereof,

I claim:

1. In an apparatus for electric arc welding, an electrode, a magnet surrounding the electrode, an annular extension of paramagnetic material in contact with the magnet, terminating approximately at the end of the electrode and having an opening through which the electrode projects, the wall of the opening being spaced from the electrode and a pole having one end in contact with the magnet, extending to and terminating in spaced relation to the end of the electrode to afford a magnetic flux field surrounding and directing the arc toward the pole, the pole being normally fixed but rotatively mounted for adjustment about the axis of the electrode.

2. In an apparatus for electric arc welding, an electrode, a magnet surrounding the electrode, an annular extension of paramagnetic material in contact with the magnet, terminating approximately at the end of the electrode and having an opening through which the electrode projects, the wall of the opening being spaced from the electrode, and a pole having one end in contact with the magnet, extending to and terminating in spaced relation to the end of the electrode to afford a magnetic flux field surrounding and directing the arc toward the pole.

3. In an apparatus for electric arc welding, an electrode, a magnet surrounding the electrode, an annular extension of paramagnetic material in contact with the magnet, terminating approximately at the end of the electrode and having an opening through which the electrode projects, the wall of the opening being spaced from the electrode and a pole having one end in contact with the magnet, extending to and terminating in spaced relation to the end of the electrode to afford a magnetic flux field surrounding and directing the arc toward the pole, the magnet forming a chamber surrounding the electrode through which a shielding gas may be directed to the arc.

GLENN J. GIBSON.

REFERENCES CITED

The following references are of record in the file of this patent:

UNITED STATES PATENTS

| Number | Name | Date |
|---|---|---|
| 515,652 | Coffin | Feb. 27, 1894 |
| 1,740,381 | Weed | Dec. 17, 1929 |
| 1,851,479 | Andren et al. | Mar. 29, 1932 |
| 1,854,536 | Wilson | Apr. 19, 1932 |
| 1,921,572 | Kinnard | Aug. 8, 1933 |